US012104424B2

(12) United States Patent
Zhang et al.

(10) Patent No.: US 12,104,424 B2
(45) Date of Patent: Oct. 1, 2024

(54) LOGIC INTELLIGENT CONTROL SYSTEM OF TRAIN DOOR BASED ON INTELLIGENT CONTROL UNITS

(71) Applicant: CRRC QINGDAO SIFANG CO., LTD., Shandong (CN)

(72) Inventors: An Zhang, Shandong (CN); Jianying Liang, Shandong (CN); Bowen Jiang, Shandong (CN); Chuanming Sun, Shandong (CN); Mengyang Shi, Shandong (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 390 days.

(21) Appl. No.: 17/635,906

(22) PCT Filed: Apr. 22, 2020

(86) PCT No.: PCT/CN2020/086049
§ 371 (c)(1),
(2) Date: Feb. 16, 2022

(87) PCT Pub. No.: WO2021/031597
PCT Pub. Date: Feb. 25, 2021

(65) Prior Publication Data

US 2022/0282552 A1 Sep. 8, 2022

(30) Foreign Application Priority Data

Aug. 20, 2019 (CN) ......................... 201910770106.2

(51) Int. Cl.
*E05F 15/70* (2015.01)
*E05B 77/54* (2014.01)

(52) U.S. Cl.
CPC .............. *E05F 15/70* (2015.01); *E05B 77/54* (2013.01); *E05Y 2900/51* (2013.01); *E05Y 2900/531* (2013.01)

(58) Field of Classification Search
CPC ...... E05F 15/70; E05B 77/54; E05Y 2900/51; E05Y 2900/531

(Continued)

(56) References Cited

U.S. PATENT DOCUMENTS 7,721,653 B1 * 5/2010 Burgess .................... B61B 1/02 104/30
2008/0036578 A1 * 2/2008 Toyama .................. E05F 15/40 701/49

(Continued)

FOREIGN PATENT DOCUMENTS

BE 901676 A 8/1985
CN 201514561 U 6/2010

(Continued)

OTHER PUBLICATIONS

China National Intellectual Property Administration, International Search Report issued in corresponding Application No. PCT/CN2020/086049 mailed Jul. 15, 2020.

(Continued)

*Primary Examiner* — Md Azad
(74) *Attorney, Agent, or Firm* — Stites & Harbison, PLLC; Jeffrey A. Haeberlin

(57) ABSTRACT

Embodiments of the present invention disclose a logic intelligent control system of train door based on intelligent control unit. The system comprises: a first intelligent control unit located in a selected vehicle of a train, a second intelligent control unit located in each of the other remaining vehicles of the train, and a door controller located in each vehicle. The first intelligent control unit is configured to (Continued)

output corresponding door control instructions through the corresponding door control instruction output port after acquiring door control operation information; the door control instruction input ports corresponding to the first intelligent control unit and the second intelligent control units are configured to drive corresponding door controller control ports to control the door controllers of a corresponding vehicle to execute the door control instruction after receiving the door control instructions.

9 Claims, 3 Drawing Sheets

(58) Field of Classification Search
USPC .......................................................... 700/275
See application file for complete search history.

(56) References Cited

U.S. PATENT DOCUMENTS

| | | | | |
|---|---|---|---|---|
| 2011/0185941 A1* | 8/2011 | Gonzalez Fernandez | H02P 7/29 | 105/341 |
| 2021/0037215 A1* | 2/2021 | Hirai | H04N 7/181 | |
| 2021/0131163 A1* | 5/2021 | Ding | B61L 27/40 | |

FOREIGN PATENT DOCUMENTS

| | | | |
|---|---|---|---|
| CN | 101936110 | A | 1/2011 |
| CN | 102979396 | A | 3/2013 |
| CN | 106246034 | A | 12/2016 |
| CN | 106428045 | A | 2/2017 |
| CN | 206928820 | U | 1/2018 |
| CN | 109779444 | A | 5/2019 |
| CN | 110644883 | A | 1/2020 |
| GB | 2438644 | A | 12/2007 |
| IN | 106014074 | A | 10/2016 |
| JP | 2003-138823 | A | 5/2003 |

OTHER PUBLICATIONS

China National Intellectual Property Administration, First Search Report issued in corresponding Application No. 201910770106, dated Sep. 27, 2020 (Translation not available).

China National Intellectual Property Administration, Supplementary Search Report issued in corresponding Application No. 201910770106, dated Apr. 13, 2021 (Translation not available).

* cited by examiner

LOGIC INTELLIGENT CONTROL SYSTEM OF TRAIN DOOR BASED ON INTELLIGENT CONTROL UNITS

CROSS-REFERENCE TO RELATED APPLICATION

The present application claims priority to Chinese application No. 201910770106.2 filed on Aug. 20, 2019, entitled "Logic Intelligent Control System of Train Door Based on Intelligent Control Units," which is hereby incorporated by reference in its entirety.

FIELD OF TECHNOLOGY

The present application relates to the technical field of automatic control, in particular to a logic intelligent control system of train door based on intelligent control units.

BACKGROUND

For a door logic control circuit of a multiple-unit train, a large number of relays are involved, which increases the risk of failure of the entire system due to a single point of failure. In addition, penetrating cables of the vehicle has a complex structure due to the large number of doors involved. At present, when the door logic control needs to be reformed, firstly, it is necessary to carry out circuit reformation on the basis of an original circuit, and such reformation may involve the discarding and remanufacturing of the circuit board or the modification of the external wiring. Secondly, for the current structure of vehicle logic control, all printed circuit boards have the risk of burning, and all the protection to avoid burning is concentrated on a side of the air switch, hence, provided that a fault occurs and the air switch is tripped, there will be a failure of a large area of the logic control circuit, and it would be exorbitant to protect each circuit with the current technology.

SUMMARY

In order to solve or at least partially solve the problems in the related art, embodiments of the present application provide a logic intelligent control system of train door based on intelligent control units.

The logic intelligent control system of train door based on intelligent control units according to an embodiment of the present application includes: a first intelligent control unit, a second intelligent control unit and a door controller, and the first intelligent control unit is located in a selected vehicle, the second intelligent control units are located in each of the remaining vehicles, and the door controllers are located in each vehicle; the first intelligent control unit includes a plurality of door control instruction output ports, and both the first intelligent control unit and the second intelligent control units are provided with a plurality of door control instruction input ports corresponding to the plurality of door control instruction output ports; the first intelligent control unit is configured to output corresponding door control instructions through the corresponding door control instruction output port after acquiring door control operation information; the door control instruction input ports corresponding to the first intelligent control unit and the second intelligent control units are configured to drive corresponding door controller control ports to control the door controllers of a corresponding vehicle to execute the door control instruction after receiving the door control instructions.

In an embodiment, on the basis of the foregoing embodiment, the door control instructions include a right door opening instruction, a right door closing instruction, a right door releasing instruction, a left door opening instruction, a left door closing instruction and a left door releasing instruction; each door controller control port includes a right door opening control port, a right door closing control port, a right door releasing control port, a left door opening control port, a left door closing control port and a left door releasing control port.

In an embodiment, on the basis of the foregoing embodiments, the first intelligent control unit and the second intelligent control units are configured to be connected with a train braking control unit through a first speed signal acquisition port and a second speed signal acquisition port, respectively; wherein, the first speed signal acquisition port is configured to have a signal when a train speed is equal to or less than a first preset speed, and have no signal when the train speed is greater than the first preset speed; the second speed signal acquisition port is configured to have a signal when the train speed is equal to or less than a second preset speed, and have no signal when the train speed is greater than the second preset speed; the second preset speed is greater than the first preset speed.

In an embodiment, on the basis of the foregoing embodiments, when the door control operation information is right door releasing operation information, the first intelligent control unit is configured to output the right door releasing instruction through the corresponding door control instruction output port only when it is determined that the first speed signal acquisition port has a signal; when the door control operation information is left door releasing operation information, the first intelligent control unit is configured to output the left door releasing instruction through the corresponding door control instruction output port only when it is determined that the first speed signal acquisition port has a signal.

In an embodiment, on the basis of the foregoing embodiments, when the door control operation information is left door opening operation information, the first intelligent control unit is configured to output the left door opening instruction through the corresponding door control instruction output port only when it is determined that the left door releasing instruction has been output; when the door control operation information is right door opening operation information, the first intelligent control unit is configured to output the right door opening instruction through the corresponding door control instruction output port only when it is determined that the right door releasing instruction has been output.

In an embodiment, on the basis of the foregoing embodiments, the first intelligent control unit and/or the second intelligent control unit is configured to drive an automatic door closing control port to control the door controller of a corresponding vehicle to automatically close the left door and the right door when it is determined that the first speed signal acquisition port has no signal and the second speed signal acquisition port has a signal.

In an embodiment, on the basis of the foregoing embodiments, the first intelligent control unit and/or the second intelligent control unit is configured to drive an automatic door closing control port to control the door controller of a corresponding vehicle to automatically lock the left door and the right door when it is determined that the first speed signal acquisition port has no signal and the second speed signal acquisition port has no signal.

In an embodiment, on the basis of the foregoing embodiments, the first preset speed is 5 km/h, and the second preset speed is 10 km/h.

In an embodiment, on the basis of the foregoing embodiments, the logic intelligent control system further includes a forced zero-speed switch disposed in the selected vehicle; wherein the forced zero-speed switch is configured to short-circuit the train braking control unit in the event of an emergency, and send a door release permission signal to the first intelligent control unit; the first intelligent control unit is configured to output the right door releasing instruction and the left door releasing instruction through the corresponding door control instruction output ports after receiving the door release permission signal.

In an embodiment, on the basis of the foregoing embodiments, each of the first intelligent control unit and the second intelligent control units further includes a door action monitoring port, and the door action monitoring port is configured to receive a door lock in-position signal fed back by the door controllers of the a corresponding vehicle; a current monitor is disposed between the door control instruction output port and the corresponding door control instruction input port, and the current monitor is configured to disconnect a corresponding branch when a current exceeds a preset current value.

In the logic intelligent control system of train door based on intelligent control units provided by the embodiments of the present application, by using the non-contact control system, the problems of complex logic control circuit, abnormal adhesion of contacts, circuit board burning loss and the like of a current multiple-unit train are solved. In addition, the design, application and transformation cost, post-maintenance cost and spare parts cost of the multiple-unit train can be saved; the reliability of the logic control circuit of the multiple-unit train is improved and the complex control circuit is simplified, which improves the efficiency of post-maintenance and reconstruction; moreover, a new design concept and design idea for the intelligent multiple-unit train are provided.

BRIEF DESCRIPTION OF THE DRAWINGS

In order to more clearly illustrate technical solutions in the embodiments of the present application or the prior art, drawings needed in the descriptions of the embodiments or the prior art will be briefly described below. The drawings in the following description only show some embodiments of the present application, and other drawings can be obtained according to these drawings without any creative work for those skilled in the art.

DETAILED DESCRIPTION

In order to explain the objectives, technical solutions, and advantages of the embodiments of the present application more clearly, the technical solutions in the embodiments of the present application will be clearly and completely described below in conjunction with the drawings in the embodiments of the present application. The described embodiments are parts of the embodiments of the present application, rather than all of the embodiments. Based on the embodiments in the present application, all other embodiments obtained by those of ordinary skill in the art without creative work shall fall within the scope of protection of the present application.

Figure 1:
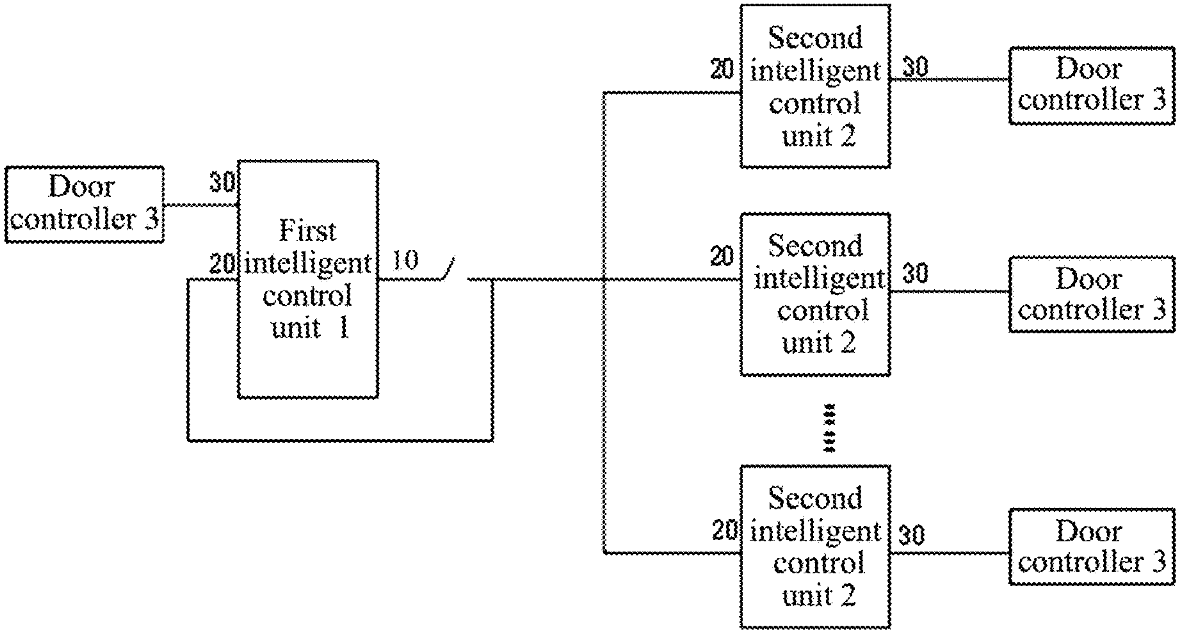
FIG. 1 is a schematic diagram showing a principle of a logic intelligent control system of train door based on intelligent control units according to an embodiment of the present application.

FIG. 1 is a schematic diagram showing a principle of a logic intelligent control system of train door based on intelligent control units according to an embodiment of the present application. As shown in FIG. 1, the logic intelligent control system includes: a first intelligent control unit 1, a second intelligent control unit 2 and a door controller 3. The first intelligent control unit 1 is located in a selected vehicle, the second intelligent control unit 2 is located in each of the remaining vehicles, and the door controller 3 is located in each vehicle; the first intelligent control unit 1 includes a plurality of door control instruction output ports 10, and both the first intelligent control unit 1 and the second intelligent control units 2 are provided with a plurality of door control instruction input ports 20 corresponding to the plurality of door control instruction output ports 10; the first intelligent control unit 1 is configured to output corresponding door control instructions through the corresponding door control instruction output port 10 after acquiring door control operation information; the door control instruction input ports 20 corresponding to the first intelligent control unit 1 and the second intelligent control units 2 are configured to drive corresponding door controller control ports 30 to control the door controllers 3 of a corresponding vehicle to execute the door control instruction after receiving a door control instruction.

The system includes a first intelligent control unit 1 located in the selected vehicle, a second intelligent control unit 2 located in each of the remaining vehicles, and door controllers 3 located in each vehicle. Same device, such as a logic control unit LCU, can be applied to the first intelligent control unit 1 and the second intelligent control units 2. However, the first intelligent control unit 1 and the second intelligent control units 2 are different in port settings and functions. For the convenience of control, the first intelligent control unit 1 is usually arranged in a host vehicle, so as to facilitate unified door control for the entire units. The first intelligent control unit 1 can also be provided in remaining vehicles according to actual needs. Each vehicle (including the host vehicle and remaining vehicles) is provided with a door controller 3, which is used to drive the door action of the corresponding vehicle.

The first intelligent control unit 1 includes a plurality of door control instruction output ports 10, and the first intelligent control unit 1 and the second intelligent control units 2 are provided with a plurality of door control instruction input ports 20 corresponding to the plurality of door control instruction output ports 10. After acquiring door control operation information, the first intelligent control unit 1 outputs corresponding door control instructions through the corresponding door control instruction output port 10. The door control operation information may be door control operation information used by a driver, such as information indicating that the driver presses a control button for opening the door. The first intelligent control unit 1 may be connected to a door control button for the driver through the door control instruction output port 10, for instance, the door control button used by the driver may be a switch shown in FIG. 1. Only when the door control button is pressed by the driver, the corresponding door control instruction output port 10 can output a signal. The first intelligent control unit 1 may include a plurality of door control instruction output ports 10, and for convenience, only one door control instruction output port 10 is shown in FIG. 1. After the door control instruction is received by the door control instruction input ports 20 corresponding to the first intelligent control unit 1 and the second intelligent control unit 2, the corresponding door controller control port 30 is driven to control the door controller 3 of the corresponding vehicle to execute the door control instruction (the door controller control port 30 can be driven through a relay structure).

According to door control requirements, the door control operation information may include right door opening operation information, right door closing operation information, right door releasing operation information, left door opening operation information, left door closing operation information and left door releasing operation information. The corresponding door control instruction output ports 10 are a right door opening control instruction output port, a right door closing control instruction output port, a right door releasing control instruction output port, a left door opening control instruction output port, a left door closing control instruction output port and a left door releasing control instruction output port, respectively; the corresponding door control instructions are a right door opening instruction, a right door closing instruction, a right door releasing instruction, a left door opening instruction, a left door closing instruction and a left door releasing instruction, respectively. The corresponding door control instruction input ports 20 are a right door opening control instruction input port, a right door closing control instruction input port, a right door releasing control instruction input port, a left door opening control instruction input port, a left door closing control instruction input port and a left door releasing control instruction input port. The corresponding door controller control ports are a right door opening control port, a right door closing control port, a right door releasing control port, a left door opening control port, a left door closing control port and a left door releasing control port, respectively.

As an illustration, after acquiring the right door opening operation information, the first intelligent control unit 1 outputs the corresponding right door opening control instruction through the right door opening control instruction output port; after receiving the door control instruction, the right door opening control instruction input port 20 of the first intelligent control unit 1 and the second intelligent control unit 2 drives the right door opening control port to control the door controller 3 of the corresponding vehicle to execute the right door opening control instruction.

In the embodiment of the present application, the intelligent control unit is used as the core, by employing a contactless control system, the problems of complex logic control circuit, abnormal adhesion of contacts, circuit board burning loss and the like of a current multiple-unit train are solved. In addition, the design, application and transformation cost, post-maintenance cost and spare parts cost of the multiple-unit train can be saved; the reliability of the logic control circuit of the multiple-unit train is improved and the complex control circuit is simplified, which improves the efficiency of post-maintenance and reconstruction; moreover, a new design concept and design idea for the intelligent multiple-unit train are provided.

In an embodiment, on the basis of the foregoing embodiment, the first intelligent control unit 1 and the second intelligent control units 2 are connected to a train braking control unit through a first speed signal acquisition port and a second speed signal acquisition port, respectively. In an embodiment, the first speed signal acquisition port has a signal when the train speed is equal to or less than a first preset speed, and has no signal when the train speed is greater than the first preset speed; the second speed signal acquisition port has a signal when the train speed is equal to or less than a second preset speed, and has no signal when the train speed is greater than the second preset speed; the second preset speed is greater than the first preset speed.

Each of the first intelligent control unit 1 and the second intelligent control unit 2 includes a first speed signal acquisition port and a second speed signal acquisition port, and the first speed signal acquisition port and the second speed signal acquisition port are respectively connected to the train braking control unit BCU for acquiring the speed signal. In an embodiment, the first speed signal acquisition port has a signal when the train speed is equal to or less than a first preset speed, and has no signal when the train speed is greater than the first preset speed; the second speed signal acquisition port has a signal when the train speed is equal to or less than a second preset speed, and has no signal when the train speed is greater than the second preset speed; the second preset speed is greater than the first preset speed.

The values of the second preset speed and the first preset speed can be set according to actual needs. Taking the first preset speed of 5 km/h and the second preset speed of 10 km/h as an example, the first speed signal acquisition port has a signal when the train speed is equal to or less than 5 km/h, and has no signal when the train speed is greater than 5 km/h; the second speed signal acquisition port has a signal when the train speed is equal to or less than 10 km/h, and has no signal when the train speed is greater than 10 km/h.

On the basis of the foregoing embodiments, according to this embodiment, a first speed signal acquisition port and a second speed signal acquisition port are disposed in the first intelligent control unit and the second intelligent control unit, so as to provide the basis for door control using speed information.

In an embodiment, on the basis of the foregoing embodiments, when the door control operation information is the right door releasing operation information, the first intelligent control unit 1 outputs the right door releasing instruction through the corresponding door control instruction output port 10 only when it is determined that the first speed signal acquisition port has a signal; when the door control operation information is the left door releasing operation information, the first intelligent control unit 1 outputs the left door releasing instruction through the corresponding door control instruction output port 10 only when it is determined that the first speed signal acquisition port has a signal.

When the door release of the entire group is controlled by the first intelligent control unit 1, the information of the vehicle speed for releasing the door can be set, for instance, the door release is allowed when the vehicle speed is equal to or less than 5 km/h. The information that the vehicle speed is equal to or less than 5 km/h can be obtained according to the signal condition of the first speed signal acquisition port. As an illustration, provided that the first preset speed is 5 km/h and the second preset speed is 10 km/h, the first speed signal acquisition port having a signal indicates that the vehicle speed is equal to or less than 5 km/h.

Therefore, when the door control operation information is the right door releasing operation information, the first intelligent control unit 1 outputs the right door releasing instruction through the right door releasing control instruction output port only when it is determined that the first speed signal acquisition port has a signal; when the door control operation information is the left door releasing operation information, the first intelligent control unit 1 outputs the left door releasing instruction through the left door releasing control instruction output port only when it is determined that the first speed signal acquisition port has a signal.

On the basis of the foregoing embodiments, in this embodiment, a reliable and practical door-release control is realized by setting a speed condition for releasing the doors.

In an embodiment, on the basis of the foregoing embodiments, when the door control operation information is the left door opening operation information, the first intelligent control unit 1 outputs the left door opening instruction through the corresponding door control instruction output port 10 only when it is determined that the left door releasing instruction has been output. When the door control operation information is the right door opening operation information, the first intelligent control unit 1 outputs the right door opening instruction through the corresponding door control instruction output port 10 only when it is determined that the right door releasing instruction has been output.

When the first intelligent control unit 1 controls the door opening (left door opening and right door opening) of the entire units, the condition for opening the doors can be that the instruction to release the door has been transmitted, i.e., releasing the door before opening the door. Therefore, when the door control operation information is the left door opening operation information, the first intelligent control unit 1 outputs the left door opening control instruction through the corresponding left door opening control instruction output port only when it is determined that the left door releasing instruction has been output. When the door control operation information is the right door opening operation information, the first intelligent control unit 1 outputs the right door opening control instruction through the corresponding right door opening control instruction output port only when it is determined that the right door releasing instruction has been output.

On the basis of the forgoing embodiments, in this embodiment, by setting releasing door before opening door, the accuracy of the door opening control logic is ensured.

In an embodiment, on the basis of the foregoing embodiments, when it is informed that the first speed signal acquisition port has no signal and the second speed signal acquisition port has a signal, the first intelligent control unit 1 and/or the second intelligent control unit 2 drives the automatic door closing control port to control the door controller of the corresponding vehicle to automatically close the left door and the right door.

In order to ensure safety, the intelligent control units of each vehicle, that is, the first intelligent control unit 1 and the second intelligent control unit 2 are provided with a first speed signal acquisition port and a second speed signal acquisition port for acquiring the speed information of the brake control unit (BCU). Taking the first preset speed of 5 km/h and the second preset speed of 10 km/h as an example, the first speed signal acquisition port having no signal and the second speed signal acquisition port having a signal indicates that the vehicle speed is between 5 and 10 km/h (including 10 km/h), at which point it is necessary to control the automatic door closing through the automatic door closing control port (belonging to the door controller control port).

Each vehicle independently controls the automatic door closing according to the speed information through the independently provided intelligent control unit. In the case that the first intelligent control unit 1 is disposed in the host vehicle, the second intelligent control units 2 are disposed in remaining vehicles, when the first intelligent control unit 1 of the host vehicle is informed that its first speed signal acquisition port has no signal and the second speed signal acquisition port has a signal, the first intelligent control unit 1 drives the automatic door closing control port to control the door controller of the vehicle to automatically close the left door and right door and when the second intelligent control unit 2 of any of the remaining vehicles is determined that its first speed signal acquisition port has no signal and the second speed signal acquisition port has a signal, the second intelligent control units 2 drive the automatic door closing control port to control the door controllers of the vehicles to automatically close the left doors and right doors.

On the basis of the foregoing embodiments, in this embodiment, the intelligent control unit provided in each vehicle controls the automatic door closing according to the signal conditions of the first speed signal acquisition port and the second speed signal acquisition port, thereby improving safety.

In an embodiment, on the basis of the foregoing embodiments, when it is determined that the first speed signal acquisition port has no signal and the second speed signal acquisition port has no signal, the first intelligent control unit 1 and/or the second intelligent control unit 2 drives the automatic door locking control port to control the door controller of the vehicle to automatically lock the left door and the right door.

Taking the first preset speed of 5 km/h and the second preset speed of 10 km/h as an example, the first speed signal acquisition port having no signal and the second speed signal acquisition port having no signal indicates that the vehicle speed is greater than 10 km/h, at which point it is necessary to control the automatic locking door through the automatic door locking control port (belonging to the door controller control port).

Each vehicle independently controls the automatic door closing according to the speed information through the independently provided intelligent control unit. In the case that the first intelligent control unit 1 is disposed in the host vehicle, the remaining vehicles are provided with the second intelligent control units 2, when the first intelligent control unit 1 of the host vehicle is informed that its first speed signal acquisition port has no signal and the second speed signal acquisition port has no signal, the first intelligent control unit 1 drives the automatic door locking control port to control the door controller of the vehicle to automatically lock the left door and the right door and when the second intelligent control unit 2 of any of the remaining vehicles is informed that its first speed signal acquisition port has no signal and the second speed signal acquisition port has no signal, the second intelligent control unit 2 drives the automatic door locking control port to control the door controller of the vehicle to automatically lock the left door and the right door.

On the basis of the foregoing embodiments, in this embodiment, the intelligent control unit provided in each vehicle controls the automatic locking of the door according to the signal conditions of the first speed signal acquisition port and the second speed signal acquisition port, thereby improving safety.

In an embodiment, on the basis of the foregoing embodiments, the system further includes a forced zero-speed switch disposed on the selected vehicle; in the event of an emergency, the forced zero-speed switch short-circuits the train braking control unit, and sends a door release permission signal to the first intelligent control unit 1; after receiving the door release permission signal, the first intelligent control unit 1 outputs the right door releasing instruction and the left door releasing instruction through the corresponding door control instruction output port.

The system further includes a forced zero-speed switch disposed on the selected vehicle, and the forced zero-speed switch is used to short-circuit the train braking control unit, namely send a bypass speed signal, and send a door release permission signal to the first intelligent control unit 1, indicating that an emergency has occurred, and in this case the door is forced to be released and is no longer limited by vehicle speed being less than 5 km/h. After receiving the door release permission signal, the first intelligent control unit 1 outputs the right door releasing instruction and the left door releasing instruction through the corresponding right door releasing instruction output port and the left door releasing instruction output port respectively, so as to allow the right and left doors to be released.

On the basis of the foregoing embodiments, in this embodiment, by providing a forced zero-speed switch to short-circuit the train control unit when an emergency occurs, the door is forced to be released, which further improves the safety.

In an embodiment, on the basis of the foregoing embodiments, the first intelligent control unit 1 and the second intelligent control unit 2 further include a door action monitoring port, and the door action monitoring port is configured to receive the door lock in-position signal fed back by the door controller 3 of the vehicle. A current monitoring module is provided between the door control instruction output port 10 and the corresponding door control instruction input port 20, and the current monitoring module is configured to disconnect the corresponding branch when the current exceeds a preset current value.

The first intelligent control unit 1 and the second intelligent control unit 2 further include a door action monitoring port, and the door action monitoring port is configured to receive a door lock in-position signal fed back by the door controller 3 of the corresponding vehicle. A relay module can be provided in the door controller 3 to monitor the door lock position signal, and after the door lock is in position, the signal is fed back to the door action monitoring port of the intelligent control unit of the vehicle through the corresponding contact, such as the door action monitoring port of the first intelligent control unit 1 of the host vehicle or the second intelligent control units 2 of remaining vehicles, to further ensure safety by feeding back the door lock in-position signal.

The door control instruction output port 10 of the first intelligent control unit 1 is connected to the door control instruction input port 20 of the intelligent control unit of each vehicle, and a current monitor may be provided between the door control instruction output port 10 and the corresponding door control instruction input port 20. The current monitor is configured to disconnect the corresponding branch when the current exceeds the preset current value, so as to independently protect each branch, and after a problem occurs in one branch, the operation of the remaining branches will not be affected.

On the basis of the foregoing embodiments, in this embodiment, by disposing the door action monitoring port in the first intelligent control unit and the second intelligent control units and disposing the current monitor between the door control instruction output port and the corresponding door control instruction input port, the safety is further ensured and the reliability is further improved.

Figure 2:
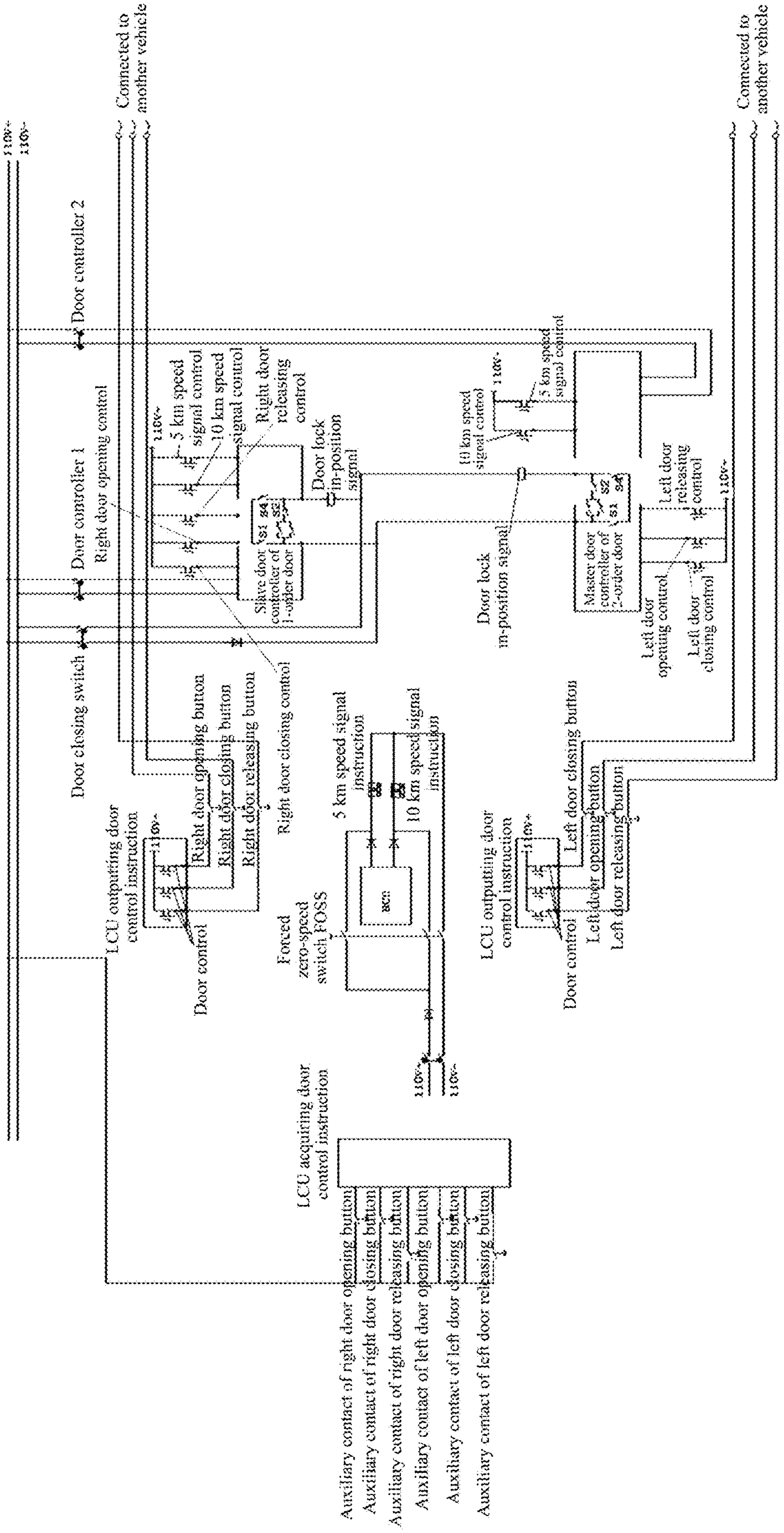
FIG. 2 is a schematic diagram showing a principle of a logic intelligent control system of train door based on intelligent control units according to another embodiment of the present application.

FIG. 2 is a schematic diagram showing a principle of a logic intelligent control system of train door based on intelligent control unit according to another embodiment of the present application. FIG. 2 shows the connection lines of a host vehicle, such as vehicle 1 and vehicle 8. The working principle of the logic intelligent control system of train door based on intelligent control unit provided by the embodiments of the present application is further described below with reference to FIG. 2.

"Right door opening button" refers to a control switch for the driver to open the right door, and the door control instruction output port of the first intelligent control unit connected thereto is the right door opening control instruction output port; "right door closing button" refers to a control switch for the driver to close the right door, and the door control instruction output port connected thereto is the right door closing control instruction output port; "right door releasing button" refers to a control switch for the driver to release the right door, and the door control instruction output port connected thereto is the right door releasing control instruction output port; "left door opening button" refers to a control switch for the driver to open the left door, and the door control instruction output port connected thereto is the left door opening control instruction output port; "left door closing button" refers to a control switch for the driver to close the left door, and the door control instruction output port connected thereto is the left door closing control instruction output port; "left door releasing button" refers to a control switch for the driver to release the left door, and the door control instruction output port connected thereto is the left door releasing control instruction output port. The door controller includes a slave door controller of 1-order door and a master door controller of 2-order door. The door control instruction input ports and connection lines of each intelligent control unit are not shown in FIG. 2.

The door control button and its auxiliary buttons are linked, for instance, "right door opening button" and "auxiliary contact of right door opening button" are linked, "right door closing button" and "auxiliary contact of right door closing button" are linked, "right door releasing button" and "auxiliary contact of right door releasing button" are linked, "left door opening button" and "auxiliary contact of left door opening button" are linked, "left door closing button" and "auxiliary contact of left door closing button" are linked, "left door releasing button" and "auxiliary contact of left door releasing button" are linked.

When the "right door opening button" is pressed, the right door opening control instruction output port outputs a signal, the "auxiliary contact of right door opening button" is closed, and the right door opening control instruction input port receives the signal and drives the right door opening control port (connected to "right door opening" control, not shown in FIG. 2) to control the door controller to open the right door; when the "right door closing button" is pressed, the right door closing control instruction output port outputs a signal, the "auxiliary contact of right door closing button" is closed, and the right door closing control instruction input port receives the signal and drives the right door closing control port (connected to "right door closing" control, not shown in FIG. 2) to control the door controller to close the right door; when the "right door releasing button" is pressed, the right door releasing control instruction output port outputs a signal, the "auxiliary contact of right door releasing button" is closed, and the right door releasing control instruction input port receives the signal and drives the right door releasing control port (connected to "right door releasing" control, not shown in FIG. 2) to control the door controller to release the right door.

When the "left door opening button" is pressed, the left door opening control instruction output port outputs a signal, the "auxiliary contact of left door opening button" is closed, and the left door opening control instruction input port receives the signal and drives the left door opening control port (connected to "left door opening" control, not shown in FIG. 2) to control the door controller to open the left door; when the "left door closing button" is pressed, the left door closing control instruction output port outputs a signal, the "auxiliary contact of left door closing button" is closed, and the left door closing control instruction input port receives the signal and drives the left door closing control port (connected to "left door closing" control, not shown in FIG. 2) to control the door controller to close the left door; when the "left door releasing button" is pressed, the left door releasing control instruction output port outputs a signal, the "auxiliary contact of left door releasing button" is closed, and the left door releasing control instruction input port receives the signal and drives the left door releasing control port (connected to "left door releasing" control, not shown in FIG. 2) to control the door controller to release the left door.

When the speed signal acquisition port for 5 km/h (i.e., the first speed signal acquisition port, not shown in FIG. 2) has no signal, and the speed signal acquisition port for 10 km/h (i.e., the second speed signal acquisition port, not shown in FIG. 2) has a signal, it indicates that the train speed is 5 to 10 km/h (including 10 km/h), then the automatic door closing control port (connected to "5 km speed signal control", not shown in FIG. 2) is driven to control the door controller of the vehicle to automatically close the left door and the right door.

When the speed signal acquisition port for 5 km/h has no signal, and the speed signal acquisition port for 10 km/h has no signal, it indicates that the speed is greater than 10 km/h, then the automatic door lock control port (connected to "10 km speed signal control", not shown in FIG. 2) is driven to control the door controller of the vehicle to automatically lock the left door and the right door.

A zero-speed protection switch (FOSS forced zero-speed switch) is provided to short-circuit the BCU in the event of an emergency, and send a door release permission signal to the first intelligent control unit. After the first intelligent control unit receives the door release permission signal, the right door releasing instruction and the left door releasing instruction are output through the corresponding door release control instruction output port.

Relays are provided in the door controller to feed back the door lock in-position signal to the intelligent control unit.

In traditional trains, the door control circuit is relatively complex, involving a great number of relays and penetrating cables, resulting in high degree of circuit complexity. Therefore, many control nodes need to perform functions such as interlocking, self-locking or conditional output of hard-wired circuits. In the embodiments of the present application, the door logic control circuit with the intelligent control unit (such as LCU) as the core is employed, and the circuit logic can be transformed and upgraded without changing any hardware through the contactless control system. In addition, in the embodiments of the present application, the protection function of a single circuit can be achieved, and when a problem occurs in a certain circuit, the functions of other circuits will not be affected.

In the embodiments of the present application, a logic control structure combining an intelligent control unit and a traditional control relay structure is used to establish a three-level safety structure of "single-channel, single-board, and bypass design", which enriches the safety structure of a vehicle, so as to ensure that the vehicle functions can be realized under various extreme working conditions; and on the premise of ensuring safety, the control link of the entire door circuit is greatly simplified, which saves costs and reduces the failure of the entire door control circuit caused by individual component failures.

In the embodiments of the present application, the currently advanced LCU can be used to implement the logic control of the vehicle door circuit, and the vehicle door is provided with a local manual door opening and closing isolation function. The manual control has a higher priority than the LCU control, so as to ensure the safety of the vehicle door. The main alternative functions and logical judgments are as follows:

1. The LCU is used to control the door release, closing and opening operations of the corresponding vehicle. In addition, the LCU determines whether the vehicle satisfies the conditions for opening and releasing the door, and the judgment of the main control terminal of the train and the automatic door closing function when the speed reaches 5 km/h are enabled through the soft logic of the LCU.
2. When a driver issues a door opening and closing instruction in the driver's cab, after the LCU determines that the vehicle satisfies the conditions for opening and closing the door, it sends a door opening and closing instruction to the door controller, and at the same time monitors whether the door is acting, as well as monitors the current of the door execution circuit.

In order to ensure that the vehicle can still implement the door control function when the LCU fails, the vehicle retains the local manual door opening and closing function, and the priority of manual control is higher than the door logic controlled by the LCU.

In the embodiments of the present application, the principle of the provided logic intelligent control system of train door based on intelligent control unit is mainly described from the functional aspect, and the specific implementation process and circuit can be realized by using existing devices (such as using relays and contacts to drive, using optocoupler diodes to access signals).

Figure 3:
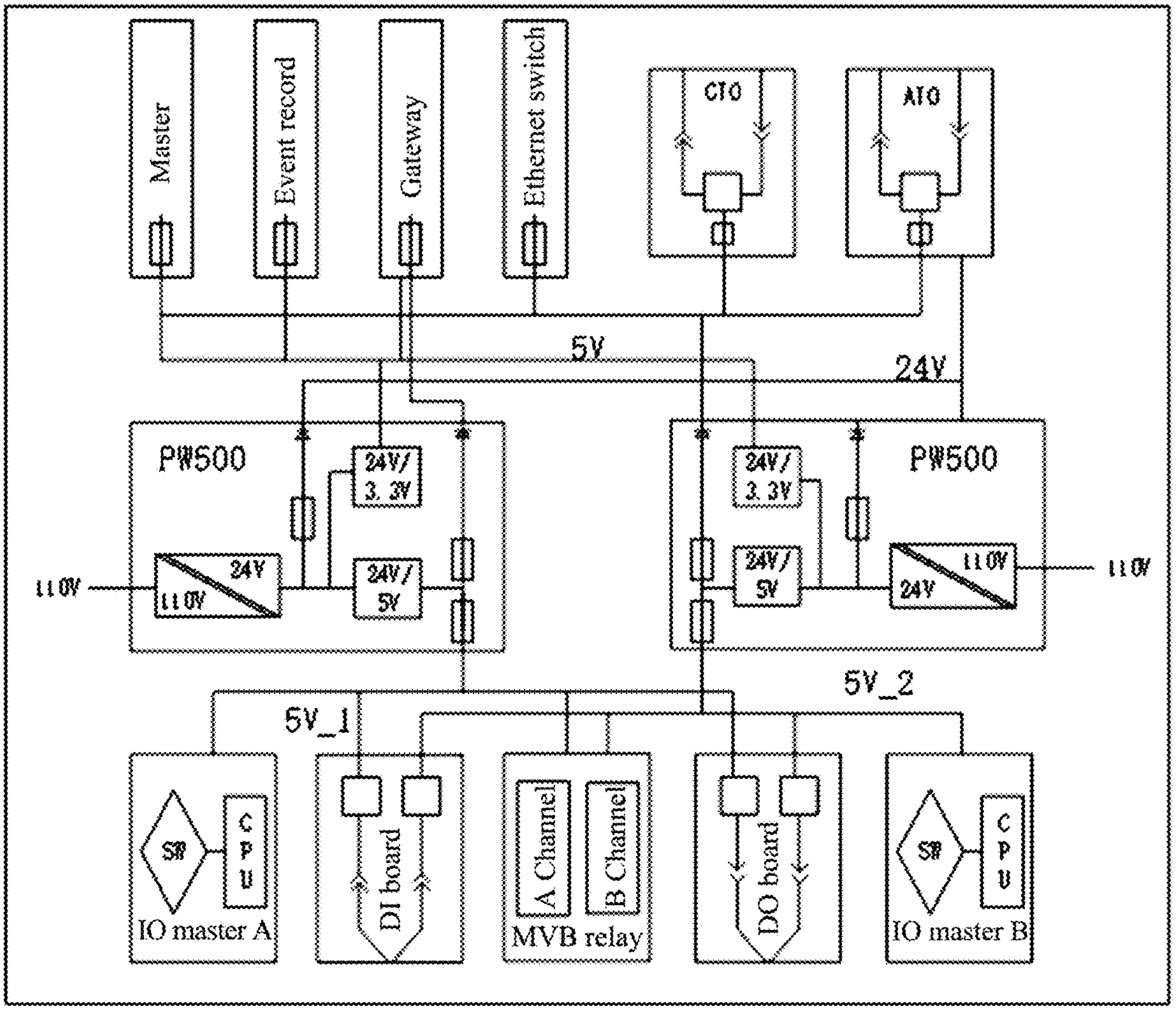
FIG. 3 is a topological structural diagram of a first intelligent control unit in a logic intelligent control system of train door based on intelligent control units according to an embodiment of the present application.

FIG. 3 is a topological structural diagram of a first intelligent control unit in a logic intelligent control system of train door based on intelligent control unit according to an embodiment of the present application. As shown in FIG. 3, the system is added with data acquisition, soft logic control, dual-machine hot standby redundant control core and an event recorder and other related structures on the basis of the original logic. In the topological structure, it can be seen that the main control module, event recording module, gateway, Ethernet switch module, GIO module, AIO module, PW500, IO master control module, DI board, DO board, MVB relay are included. Through this logic circuit, functions such as soft logic monitoring, overcurrent self-protection of input and output points, input and output channel-level redundancy, input and output signal monitoring self-diagnosis, and real-time modification of soft logic using the secondary development platform can be realized. The control core of dual-machine hot standby redundancy is reflected in the redundant settings of PW500, DI board, DO board and the like, as shown in FIG. 3. The output of the DO board is one of the door control instruction output ports 10, and the other door control instruction output ports 10 have similar structures.

It can be understood that each element or module in the embodiments of the present application may be added or deleted according to actual needs.

The device embodiments above are only illustrative, wherein the units described as separate components may or may not be physically separated, and the components shown as units may or may not be physical units, namely they may be either located in one place, or distributed to multiple network elements. Some or all of the modules may be selected according to actual needs to achieve the objectives of the solutions in the embodiments. Those of ordinary skill in the art can understand and implement them without creative effort.

From the description of the above-mentioned embodiments, those skilled in the art can clearly understand that each embodiment can be implemented by means of software plus a necessary general hardware platform, and certainly can also be implemented by hardware. Based on such understanding, the essential parts of the above technical solutions or the parts that make contributions to the prior art can be embodied in the form of computer software products. The computer software products can be stored in a computer-readable storage medium, such as ROM/RAM, magnetic disk, compact disk, and include several instructions for causing a computer device (which can be a personal computer, a server, a network device and the like) to execute the methods described in various embodiments or portions of embodiments.

Finally, it should be noted that all the embodiments above are only used to explain the technical solutions of the present application, and are not limited thereto. Although the present application has been described in detail with reference to the foregoing embodiments, it should be understood by those skilled in the art that they can still modify the technical solutions recorded in the foregoing embodiments and make equivalent substitutions to a part of the technical features, and these modifications and substitutions do not make the essence of the corresponding technical solutions depart from the scope of the technical solutions of various embodiments of the present application.

What is claimed is:

1. A logic intelligent control system of train door based on intelligent control units, comprising: a first intelligent control unit, a second intelligent control unit and a door controller, wherein the first intelligent control unit is located in a selected vehicle of a train, the second intelligent control unit is located in each of remaining vehicles of the train, and the door controller is located in each vehicle of the train; the first intelligent control unit comprises a plurality of door control instruction output ports, and the first intelligent control unit and the second intelligent control unit are provided with a plurality of door control instruction input ports corresponding to the plurality of door control instruction output ports;

the first intelligent control unit is configured to output a corresponding door control instruction through a corresponding door control instruction output port after acquiring door control operation information; and each door control instruction input port is configured to drive a corresponding door controller control port to control the door controller of a corresponding vehicle to execute the door control instruction after receiving a door control instruction;

wherein the first intelligent control unit and the second intelligent control unit are configured to be connected with a train braking control unit through a first speed signal acquisition port and a second speed signal acquisition port, respectively;

the first speed signal acquisition port is configured to have a signal when a train speed is equal to or less than a first preset speed, and have no signal when the train speed is greater than the first preset speed;

the second speed signal acquisition port is configured to have a signal when the train speed is equal to or less than a second preset speed, and have no signal when the train speed is greater than the second preset speed; and the second preset speed is greater than the first preset speed.

2. The logic intelligent control system of train door based on intelligent control units of claim 1, wherein the door control instruction comprises a right door opening instruction, a right door closing instruction, a right door releasing instruction, a left door opening instruction, a left door closing instruction and a left door releasing instruction; and each door controller control port comprises a right door opening control port, a right door closing control port, a right door releasing control port, a left door opening control port, a left door closing control port and a left door releasing control port.

3. The logic intelligent control system of train door based on intelligent control units of claim 1, wherein, when the door control operation information is right door releasing operation information, the first intelligent control unit is configured to output the right door releasing instruction through the corresponding door control instruction output port only when it is determined that the first speed signal acquisition port has a signal; and when the door control operation information is left door releasing operation information, the first intelligent control unit is configured to output the left door releasing instruction through the corresponding door control instruction output port only when it is determined that the first speed signal acquisition port has a signal.

4. The logic intelligent control system of train door based on intelligent control units of claim 3, wherein, when the door control operation information is left door opening operation information, the first intelligent control unit is configured to output the left door opening instruction through the corresponding door control instruction output port only when it is determined that the left door releasing instruction has been output; and when the door control operation information is right door opening operation information, the first intelligent control unit is configured to output the right door opening instruction through the corresponding door control instruction output port only when it is determined that the right door releasing instruction has been output.

5. The logic intelligent control system of train door based on intelligent control units of claim 1, wherein the first intelligent control unit and/or the second intelligent control unit is configured to drive an automatic door closing control port to control the door controller of a corresponding vehicle to automatically close a left door and a right door when it is determined that the first speed signal acquisition port has no signal and the second speed signal acquisition port has a signal.

6. The logic intelligent control system of train door based on intelligent control units of claim 1, wherein the first intelligent control unit and/or the second intelligent control unit unit is configured to drive an automatic door closing control port to control the door controller of a corresponding vehicle to automatically lock the left door and the right door when it is determined that the first speed signal acquisition port has no signal and the second speed signal acquisition port has no signal.

7. The logic intelligent control system of train door based on intelligent control units of claim 1, wherein the first preset speed is 5 km/h, and the second preset speed is 10 km/h.

8. The logic intelligent control system of train door based on intelligent control units of claim 1, further comprising a forced zero-speed switch disposed on the selected vehicle, wherein the forced zero-speed switch is configured to short-circuit the train braking control unit in the event of an emergency, and send a door release permission signal to the first intelligent control unit; and the first intelligent control unit is configured to output the right door releasing instruction and the left door releasing instruction through the corresponding door control instruction output port after receiving the door release permission signal.

9. The logic intelligent control system of train door based on intelligent control units of claim 1, wherein each of the first intelligent control unit and the second intelligent control unit further comprises a door action monitoring port, and the door action monitoring port is configured to receive a door lock in-position signal fed back by the door controller of a corresponding vehicle;

a current monitor is disposed between the door control instruction output port and a corresponding door control instruction input port, and the current monitor is configured to disconnect a corresponding branch when a current in the corresponding branch exceeds a preset current value.

* * * * *